INVENTORS
Walter C. Rhodes
Charles B. Kirkham
ATTORNEY

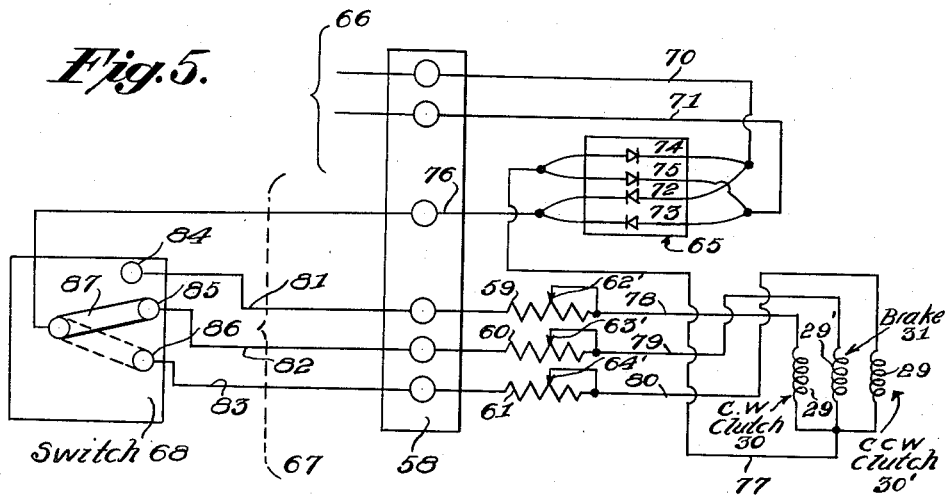
Fig. 5.
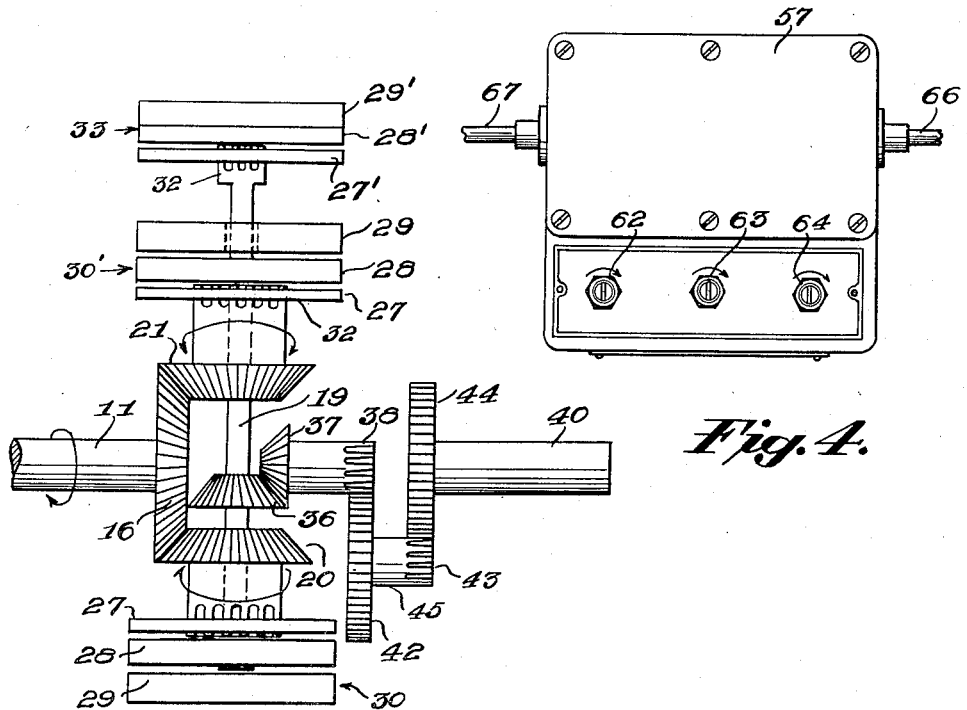
Fig. 4.
Fig. 6.
INVENTORS
Walter C. Rhodes
and Charles B. Kirkham
BY
ATTORNEY March 15, 1960     W. C. RHODES ET AL     2,928,513
POWER TRANSMISSION UNITS
Filed Feb. 6, 1957     4 Sheets-Sheet 4
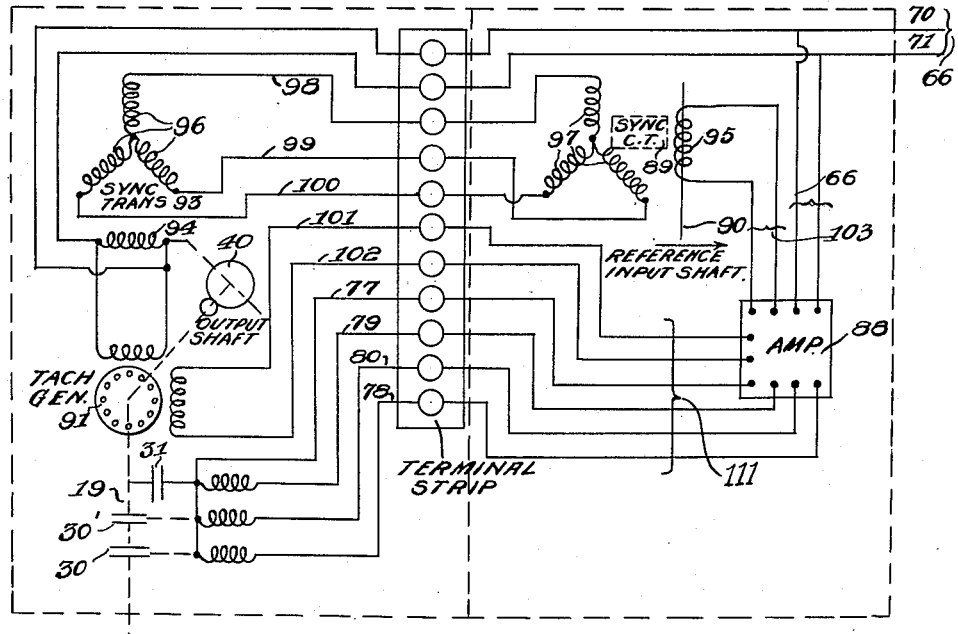
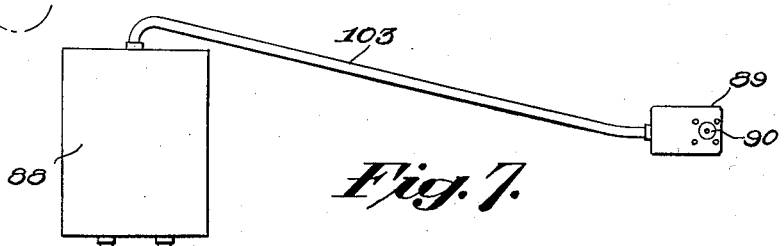
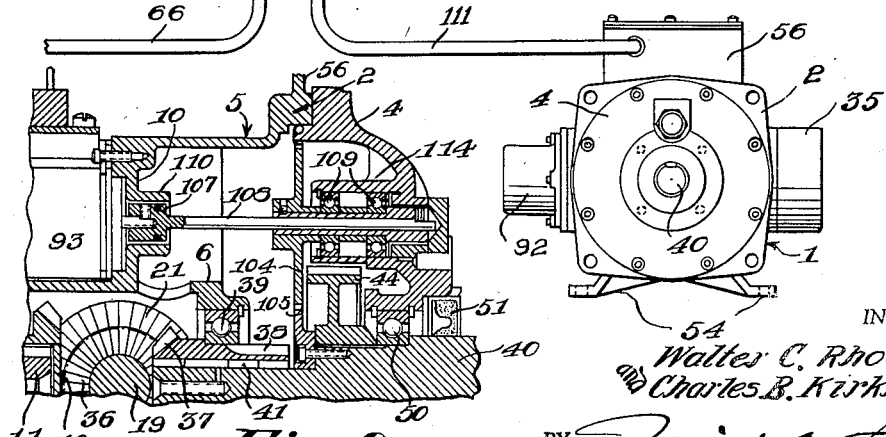
INVENTORS
Walter C. Rhodes
and Charles B. Kirkham
BY
ATTORNEY United States Patent Office 2,928,513
Patented Mar. 15, 1960

2,928,513

POWER TRANSMISSION UNITS

Walter C. Rhodes, Chatham, N.J., and Charles B. Kirkham, Montgomery, N.Y., assignors to Airborne Accessories Corporation, Hillside, N.J., a corporation of New Jersey Application February 6, 1957, Serial No. 638,654

12 Claims. (Cl. 192—4)

This invention relates to gear transmissions and more particularly to a packaged transmission system which is electrically controlled to drive, reverse and stop, and which is capable of universal application to meet special industrial needs.

Such transmission units as are available to industry for general application are subject to many disadvantages. For the most part, these include bulkiness, excessive weight, difficult and slow control, extensive maintenance and limited applications, particularly the inability to meet the need for automatic and accurate positioning of heavy loads.

It is a primary object of the invention to overcome the above stated disadvantages of currently available transmissions by the provision of a small, compact, reversible, gear transmission unit completely encased in a housing and having electrically controlled clutches and a brake included therein, and whose parts, by reason of their ruggedness and the operation of the mechanical elements in an oil filled and sealed environment, require no adjustment for the life of the transmission unit.

A further object of the invention lies in the provision of suitably positioned oil seals within the unit housing to separate the electromagnetic clutches and brake from oil filled portions of the housing thus permitting operation of the gears in an oil bath and contributing to the durability, long life and trouble-free operation of the transmission unit.

Another object of the invention is to provide a reversing, gear transmission unit electrically controlled to which may be applied synchro transformer and amplifier circuits so that by means of a closed servo loop, accurate positioning of a heavy load may be accomplished either manually or by means of automatic control directed by an associated machine.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts through the several figures and in which:

Fig. 4 is a top plan view of the terminal box alone which houses certain of the electrical controls of the transmission unit;

Fig. 5 is a schematic wiring diagram showing the electrical circuits for control of the transmission unit;

Fig. 6 is a simplified sketch of the transmission gearing, clutch and brake arrangement;

Fig. 7 is an end elevation of a transmission unit modified to include accurate output positioning means;

Fig. 8 is a schematic wiring diagram for the modified transmission unit shown in Fig. 7, and Fig. 9 is a reduced fragmentary vertical section similar to Fig. 2 showing the modification to add a synchro transmitter.

Figure 1:
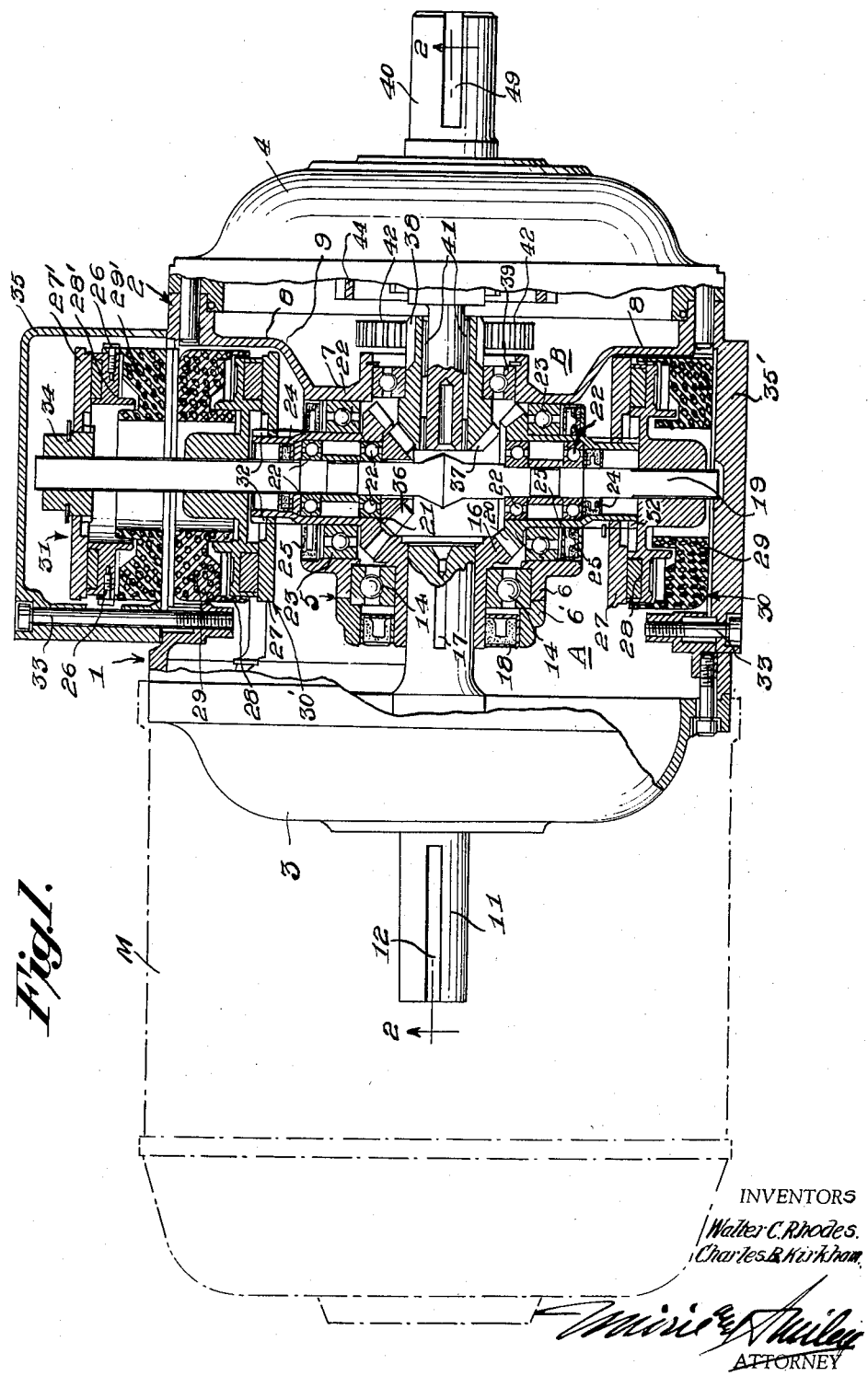
Fig. 1 is a top plan view of the transmission unit in accordance with the invention shown directly coupled to a drive motor and having portions of the housing broken away to reveal a central horizontal section through the gearing of the unit.

Referring now more particularly to the drawings, specifically to the embodiment of the invention illustrated in Figs. 1–6, there is shown a transmission unit 1 to which may be directly coupled a driving motor M. The drive motor, shown in dotted outline, is three horsepower or larger and, if desired, may be indirectly coupled to the transmission unit.

The transmission unit 1 is housed in a generally barrel-shaped casing 2 whose open ends are closed by end bells 3 and 4. The end bells provide openings for journaling the input and output shaft as shall hereinafter be described. Additional journals are provided for these shafts and the internal gearing by member 5 disposed within and integral with the casing 2 and dividing the casing roughly into two compartments A and B, the latter of which retains oil for splash lubrication of the shafts, bearings and gears.

The member 5 comprises a horizontally disposed cylindrical portion 6 intersecting at right angles horizontally with a second cylindrical portion 7. The portion 7 has integral cylindrical extensions 8 of larger diameter at its ends which are partly cut away for ease of assembly purposes and which partially enclose the clutches. A web 9 connects cylinders 7 and 8. A vertically disposed central flange 10 (Fig. 2) on journal member 5 serves to complete the sealing of chambers A and B from each other.

The power input shaft 11 is provided with a key slot 12 externally of the casing and is journaled in ball bearings 13 and 14, respectively held in bell 3 and portion 6 of member 5. The bearings 13 are packed with grease but all other bearings to be described may be lubricated by an oil supply in chamber B. The raceways of bearing 13 are retained in place by rings 15 which are partially embedded in shaft 11 and end bell 3. The same means may be employed for retaining many of the other bearings and oil seals in the assembly to be described, but the outer raceway of the bearing 14 is shown as being retained by a ring 6' bolted (Fig. 2) to the end of the cylinder 6. A bevel gear 16 is secured to the inner end of input shaft 11, within chamber B, by a key 17. The open end 6 of journal member 5 is closed by an annular oil seal 18.

A horizontally disposed shaft 19 extends from side to side within the casing 2 and through the cylinders 7 and extends beyond one side wall of the casing. Bevel gears 20 and 21 mesh with gear 16 at opposite sides and revolve in opposite directions on shaft 19. Four spaced annular ball bearing assemblies 22 rotatively support the gears 20 and 21 on shaft 19 while two additional bearings 23 journal the shaft and gear assembly in cylindrical portion 7 of member 5. A pair of annular oil seals 24 and 25 placed at each outer end of gears 20 and 21 and substantially abut the bearings 22 and 23 to prevent escape of oil from the assembly of gears and bearings on shaft 19.

A pair of similar electromagnetic clutch assemblies 30, 30' are supported in chamber A within casing 2 and surround shaft 19, as shown in Figs. 1 and 6. Each clutch comprises an armature 27, a rotor 28 and a field 29. The hubs of gears 20 and 21 are provided with splines 32 to guide the similarly splined armatures 27 in limited sliding movement along the axes of the gears and shaft 19 toward their corresponding rotors. Each rotor 28 is fixed to shaft 19 and has an annulus of friction material embedded in the face of the rotor which frictionally engages the armature upon electrically controlled magnetic attraction. Each clutch field 29 is provided with wire coils for passage of electric current and is fastened to the unit casing 2 as by means of dowel pins 33 which fit into notches provided in peripheral flanges of the clutch fields. When one of the clutch fields is energized, the corresponding armature 27 will be attracted to its rotor 28 and cause it to rotate along with the shaft 19 to which the rotor is fastened.

A brake 31 similar to the described clutches is positioned outside of the casing 2 but within a protective housing 35. The brake field 29' is also fixed to the housing 2 by the dowel pins 33. The brake shoe 28', which corresponds to the clutch rotors, is securely fixed to the field 29' as by screws 26. The brake armature 27' is mounted on a small splined hub 34 fixed to shaft 19 and is free to slide along the hub when attracted to the brake shoe. Thus, the brake armature 27' will rotate with shaft 19 until the brake is energized at which time it will be magnetically attracted to the anchored brake shoe and will stop the shaft 19. At the end of shaft 19 opposite the brake 31, a plate 35' closes the opening in casing 2.

Figure 2:
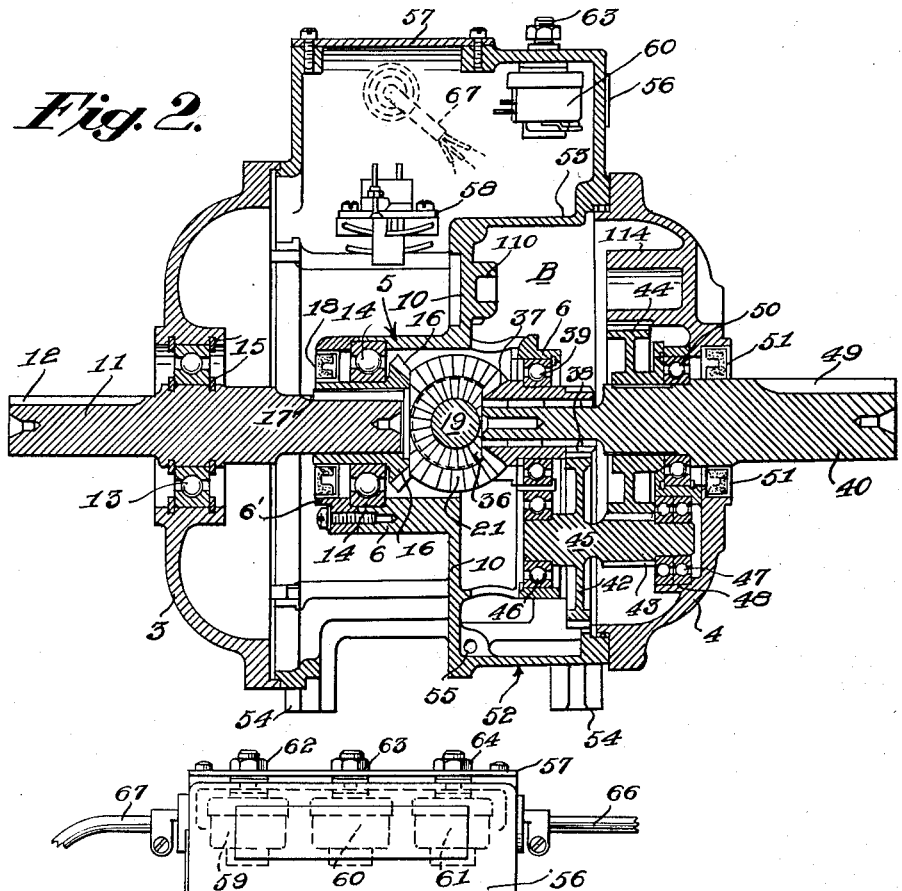
Fig. 2 is a vertical section through the transmission unit taken on the line 2—2 of Fig. 1.
Figure 3:
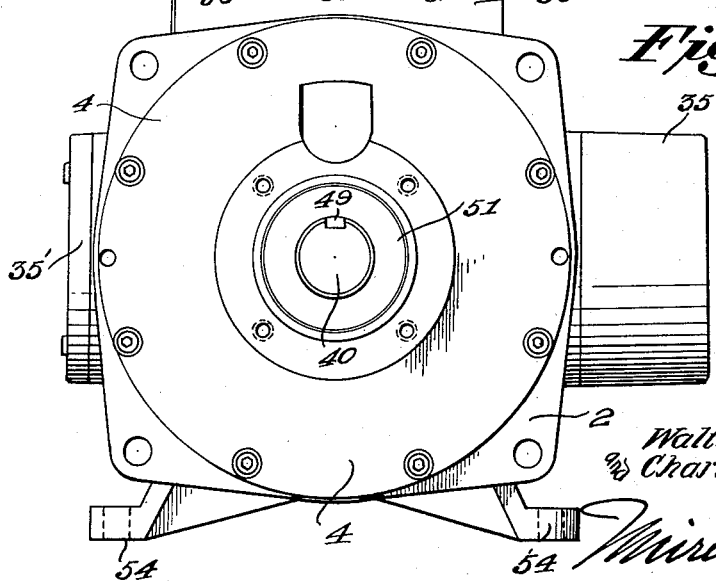
Fig. 3 is an end elevation of the transmission unit looking toward the output shaft.

A bevel gear 36 is fastened to and rotates with shaft 19 to drive a bevel gear 37. Integral with gear 37 on the opposite end of the same hub is a spur gear 38. These gears are journaled in tubular part 6 of member 5 by a ball bearing 39, and rotate on an output shaft 40, being mounted thereon by inner roller bearings 41. The gear 38, as shown in Figs. 2 and 6, drives a spur gear reduction train comprising gears 42, 43 and 44, the last being fastened to and driving the output shaft 40. Gears 42 and 43 are formed integrally on the same hub 45 which is journaled at one end in a ball bearing 46 carried by portion 10 of member 5. The other end of hub 45 is journaled in ball bearing 47 carried in an annular well 48 offset from the center of end bell 4. Output shaft 40 is provided with a key slot 49 externally of the end bell 4 and is journaled therein by means of ball bearing 50. An oil seal 51 seals the end bell journal opening around shaft 40 and retains oil within the end bell and chamber B. In the arrangement shown, the output shaft 40 is co-axial with the input shaft 11.

The member 5 is, by means of extensions 52 and 53 of irregular shape to portion 10, adapted to close openings at the top and bottom of casing 2. The bottom extension 52 carries integral feet 54 for supporting the transmission unit. An oil drain opening 55, normally closed by a screw, is provided through the bottom of extension 52. An oil fill opening, not visible in the figures, is provided in the upper part of casing 2.

The upper extension 53 is formed into a rectangular housing portion 56 above the transmission chamber B and has an opening in its upper wall which is closed by a removable cover plate 57. Within the housing 56 and free from access of oil in chamber B, are contained those circuit elements necessary for electrical control of the clutches and brake. Referring particularly to Figs. 2 and 5, these elements include a terminal plate 58, three rheostats 59, 60 and 61 each adjustable by external screws 62, 63 and 64, respectively, a full wave bridge rectifier 65, associated wiring for connecting these in the manner shown in Fig. 5, and access cables 66 and 67 to an external power source and a control switch 68.

The described embodiment shown in Figs. 1-6 operates in the following manner. A motor M is directly or indirectly coupled to shaft 11 and turns gear 16 at the motor speed. Gears 20 and 21 being permanently meshed to gear 16 will rotate in opposite directions with respect to each other. As shaft 19 is journaled within the gears 20 and 21, said shaft 19 will not rotate with either of the gears until one of the two clutches 30, 30' is energized. This will cause the corresponding clutch armature 27, which rotates with gear 20 or 21, to be attracted to its mating rotor 28 and through the latter, turn shaft 19 in the desired direction. Reversal of direction of shaft 19 is obtained by energizing the other clutch. Since the brake armature 27' turns with shaft 19, energizing the brake field 29' will cause that armature to be attracted to the fixed brake shoe 28', stopping the rotation of shaft 19. Shaft 19, while rotating in either a clockwise or counterclockwise direction through permanently meshed bevel gears 36 and 37, drives the output shaft 40 in a corresponding direction through the train of reduction spur gears 38, 42, 43 and 44.

Of course, only one clutch 30 or 30' should be energized at a given time, and the brake 31 should not be energized while one of the clutches is energized. Provisions are made in the circuit connections to insure these conditions, as shown in the schematic wiring diagram of Fig. 5. When an operator controlling the transmission unit moves switch arm 87 to contact terminal 85, the brake 31 is energized from one side of the A.C. power source, through conductor 70, rectifier 72, conductor 76, switch arm 87, terminal 85, conductor 82, rheostat 60, adjusting contact 63', conductor 79, the field winding 29' of the brake, conductor 77, rectifier 75, conductor 71 and return to other side of the power source. When it is desired to rotate the output shaft in a clockwise direction, the switch arm 87 is moved to contact terminal 84 de-energizing the brake 31 and energizing one clutch 30 through conductor 81, rheostat 59, adjustment contact 62', conductor 78 and the field 29 of the clockwise clutch. Similarly, when it is desired to rotate the output shaft in the opposite direction, the switch arm 87 need only be moved to contact terminal 86 and make the circuit through conductor 83, rheostat 61, adjustment contact 64', conductor 80 and the field 29 of the counterclockwise clutch 30'. In this manner, operation of switch 68 causes the output shaft 40 to turn in either direction or to be quickly stopped while driving a heavy load.

The transmission as described above is adapted to perform general purpose industrial tasks involving movement of heavy loads. If it is desired to accurately position a load, the same basic transmission unit may be used with some modification of auxiliary parts and the addition of elements of a servo loop circuit. Such a modification is broadly illustrated in Figs. 7, 8 and 9. An alternating current tachometer generator 91 is directly coupled to the driven shaft 19 and positioned outside casing 2 within a housing 92 which replaces the cover 35'. The rectifiers 72—75 are omitted from the terminal box 56 and a synchro transmitter 93 is mounted within the box and chamber A, as shown in Fig. 9.

The flange 10 and bell 4, as shown in Fig. 2, are provided with cylindrical wells 110 and 114, respectively, and to accommodate the transmitter 93, the well 110 is bored, as shown in Fig. 9, to receive a sealed coupling 107 connecting the transmitter 93 with a shaft 108 that is journaled in the well 114 by bearings 109 and connected with a spur gear 104 that meshes with a spur gear 105 fixed with the output shaft 40. Thus, the rotor 94 (Fig. 8) of transmitter 93 is directly coupled to the output shaft 40. An external control amplifier 88 is connected to the elements in terminal box 56 by means of cable 111. A remote position synchro transmitter or control transformer 89, having a rotor 95 carried by a shaft 90, is connected to the amplifier by a cable 103.

The stator windings 96 and 97 of each of the synchro transmitters 93 and 89 are connected in Y and each free end is connected to the corresponding free ends of the other synchro transmitter by the conductors 98, 99 and 100 (Fig. 8). When thus connected, a voltage output will be had which is proportional to the relative angle between the synchro transmitter 93 and the control transformer 89. In other words, if the transmission output shaft 40 is at rest and the shaft 90 is carefully rotated, a point will be found where the voltage output from the transformer is a minimum. Taking this point as an arbitrary reference, if the control transformer shaft 90 is rotated in either direction from this point, the voltage output will be proportional to the angular displacement from the reference point and will be proportional to the relative angle between control transformer 89 and the transmission output shaft 40. This error voltage across coil 95 is amplified and made to energize the proper clutch in the transmission, by means of relays, not shown, to rotate the output shaft 40 and synchro transmitter 93 in such direction as to cause its error signal voltage to disappear. When this happens, the relays will deenergize the clutch and energize the brake so as to stop the output shaft 40. The amplifier 88 also senses the error signal supplied from the control transformer 89, determines whether it is clockwise or counterclockwise from the zero position and operates relays that energize the proper clutch to turn the transmission shaft 40 in the appropriate direction for neutralizing the error signal as well as to operate the brake.

The operation of the system is stabilized by use of the feedback tachometer generator 91. The output of this generator is mixed with the error signal from the control transformer 89 by means of synchro transmitter rotor winding 94 and fed to the amplifier 88 via conductors 101 and 102 in such way as to provide damping of the transmission. Stated in another manner, if a transmission output shaft 40 is driving toward a certain desired stopping position, the tachometer generator circuit will deenergize the associated clutch sufficiently beforehand so that the output shaft can be stopped by the brake at the exact position desired without being carried beyond by the inertia of the transmission. Movement of the control transformer shaft 90 is practically effortless but the transmission output shaft will follow while handling a heavy load. Thus, the operator has means for effortlessly and accurately controlling the positioning of a heavy load in either direction. Automatic rather than manual operation may be obtained by directly coupling shaft 90 of the transmitter 89 to an associated machine so that control will follow the direction of such machine.

It will be apparent from the above that the described invention provides an extremely useful, general purpose, reversible transmission which is very compact and durable and is possessed of numerous other advantages. The overall dimensions of a transmission capable of driving a three horsepower load are only 13 inches by 17½ inches. This compactness is obtained by journaling certain of the gears within one another and by journaling parts of the clutches on gear hubs. The gears, shafts and bearings are splash lubricated within the transmission casing for long life and reduced maintenance; yet the electrical parts, wiring and clutches are separated completely from access of the oil by use of oil seals and by the configuration of shaft and gear supporting member 5. It should be understood, however, that, if desired, electromagnetic oil clutches and brake may be utilized instead of the dry clutch and brake assemblies described, in which case, the oil seals and journal member 5 may be modified to permit access of oil to the clutch and brake assemblies. The clutches and brake are so mounted with fixed fields as to require no brushes or slip rings. By use of relatively minor modifications and additions of servo loop circuit elements, the transmission is adapted to accurately position loads either manually or by direction of an associated machine.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A compact transmission unit comprising a power input shaft having a bevel gear, a driven shaft at right angles to said input shaft, a pair of gears driven in opposite directions by said bevel gear and journaled on said driven shaft, a pair of electromagnetic clutches each having a rotor fastened to said driven shaft and a stationary field coaxial with and surrounding said driven shaft, an electromagnetic brake having an armature fastened to said driven shaft and a stationary field and brake shoe coaxial with said driven shaft, a pair of clutch armatures slidably mounted on said pair of gears each of which is coupled to rotate with its corresponding gear, means for selectively energizing one of said clutches or said brake so as to drive said driven shaft in a desired direction or stop said drive shaft, respectively, an output shaft in alignment with said input shaft, a train of reduction gears operably connecting said driven shaft to said output shaft, a housing encasing said driven shaft, said gears and said electromagnetic clutches, and partition means within said housing separating said gears from said clutches whereby to prevent access to said clutches of oil surrounding said gears.

2. A transmission unit as defined in claim 1 wherein one gear of said train of reduction gears is journaled on and is to rotate about said output shaft as an axis.

3. A transmission unit as defined in claim 1 wherein one gear of said train of reduction gears is keyed to said driven shaft between said pair of gears.

4. A transmission unit comprising a housing, a power input shaft and an output shaft mounted in axial alignment and journaled in bearings held in openings of said housing, an auxiliary journaling member supported within said housing and having a cylindrical portion for journaling said input and output shafts, a driven shaft mounted at right angles to said input and output shafts, a second cylindrical portion on said auxiliary member, said driven shaft being journaled in said second cylindrical portion, a bevel gear on said input shaft, a pair of gears driven in opposite directions by said bevel gear and journaled on said driven shaft, a pair of electromagnetic clutches each having a rotor fastened to said driven shaft and a stationary field, an electromagnetic brake having an armature fastened to said driven shaft and a stationary field and brake shoe, a pair of clutch armatures slidably mounted on said pair of gears each of which is coupled to rotate with its corresponding gear, means for selectively energizing one of said clutches or said brake so as to drive said driven shaft in a desired direction or stop said driven shaft, respectively, a train of reduction gears connecting said driven shaft to said output shaft, one gear of said train of reduction gears being journaled on and to rotate about said output shaft as an axis, and said auxiliary journaling member being provided with extensions which divide the interior of said housing into separate compartments one of which contains said electromagnetic clutches and the other of which contains oil for splash lubrication of said shafts and gears.

5. A transmission unit as defined in claim 4 wherein a plurality of annular oil seals are provided about the said shafts and within the journal openings of the said auxiliary member to insure retention of oil in the said oil compartment free from access to said electromagnetic members.

6. A transmission unit as defined in claim 4 wherein said auxiliary journaling member is provided with an additional extension of rectangular shape which projects above and closes the top of said transmission housing, said additional extension housing circuit elements electrically connecting said clutches and brake to a source of electric power.

7. A transmission unit comprising a housing, an input shaft and an output shaft journaled in bearings held in openings in said housing, an auxiliary journaling member supported within said housing and having a first portion for journaling said input and output shafts, a driven shaft mounted at right angle to said input and output shafts within said housing, a second portion on said auxiliary member, said driven shaft being journaled in said second portion, gear means for imparting motion from said input shaft to said driven shaft in either of two directions, additional gear means for connecting said driven shaft to said output shaft, electromagnetic clutch and brake means including friction discs mounted on said driven shaft for selectively controlling its direction of movement or stopping such movement respectively, and said auxiliary journaling member being provided with a third portion which divides the interior of said housing into separate compartments one of which contains said electromagnetic clutch means and friction discs from which oil is excluded and the other of which contains oil for splash lubrication of said shafts and gear means.

8. A transmission unit comprising a housing, an input shaft entering said housing, a driven shaft, an auxiliary journaling member within the housing having portions for journaling said input and driven shafts, gear means for imparting motion from said input shaft to said driven shaft, electromagnetic clutch and brake means including friction discs mounted on said driven shaft for selectively controlling its movement or stopping said driven shaft, respectively, said auxiliary journaling member being provided with a portion which divides the interior of said housing into separate compartments one of which contains said electromagnetic clutch means from which oil is excluded and the other of which may be provided with oil for splash lubrication of said shafts and gear means.

9. A transmission unit comprising a housing, an input shaft entering said housing, a driven shaft, a partition in said housing which divides the housing into separate oil sealed compartments, gear means for imparting motion from said input shaft to said driven shaft in one of said compartments, and electromagnetic means including friction discs mounted in said other compartment for selectively controlling movement of the driven shaft.

10. A transmission unit comprising in combination a power input shaft having a bevel gear, a driven shaft at right angle to said input shaft, a pair of gears driven in opposite directions by said bevel gear and journaled on said driven shaft, a pair of electromagnetic clutches each having a rotor fastened to said driven shaft and a stationary field coaxial with and surrounding said driven shaft, an electromagnetic brake having an armature fastened to said driven shaft and a stationary field and brake shoe coaxial with said driven shaft, a pair of clutch armatures slidably mounted on said pair of gears each of which is coupled to rotate with its corresponding gear, an output shaft in alignment with said input shaft, a train of reduction gears operably connecting said driven shaft to said output shaft, a synchro transmitter mechanically coupled to said output shaft, a synchro control transformer located at a remote position, a servo loop circuit connecting said synchro transmitter electrically to said control transmitter, and electric circuit means for selectively energizing said clutches and brake in response to movement of the shaft of said control transmitter to accurately drive said output shaft to a desired position.

11. A transmission unit comprising in combination a power input shaft having a bevel gear, a driven shaft, a pair of gears driven in opposite directions by said bevel gear and journaled on said driven shaft, a pair of electromagnetic clutches each having a rotor fastened to said driven shaft and a stationary field, an electromagnetic brake having an armature fastened to said driven shaft and a stationary field and brake shoe, a pair of clutch armatures slidably mounted on said pair of gears each of which is coupled to rotate with its corresponding gear, an output shaft, means for operably connecting said driven shaft to said output shaft, a synchro transmitter mechanically coupled to said output shaft, a synchro control transformer located at a remote position, a servo loop circuit connecting said synchro transmitter electrically to said control transmitter, and electric circuit means for selectively energizing said clutches and brake in response to movement of the shaft of said control transmitter to accurately drive said output shaft to a desired position.

12. A combination transmission unit as defined in claim 11 comprising a tachometer generator mechanically coupled to said driven shaft and an amplifier remote from said transmission unit forming part of said electric circuit means for selectively energizing said clutches and brake, and means for mixing the electrical output of said tachometer generator with a signal from said control transformer in the rotor winding of said synchro transmitter and feeding the result to said amplifier for deenergizing an appropriate clutch to prevent overdriving of a desired position because of inertia of said transmission unit.

References Cited in the file of this patent

UNITED STATES PATENTS

| | | |
|---|---|---|
| 548,650 | Mayer | Oct. 29, 1895 |
| 1,205,968 | Blankenship | Nov. 28, 1916 |
| 1,323,985 | Jones | Dec. 2, 1919 |
| 1,496,867 | Bee | June 10, 1924 |
| 1,721,592 | Gattrell | July 23, 1929 |
| 2,176,897 | Fodor | Oct. 24, 1939 |
| 2,454,424 | Baak | Nov. 23, 1948 |
| 2,613,773 | Gilfillan | May 5, 1951 |
| 2,784,610 | Block | Mar. 12, 1957 |
| 2,867,127 | Fehr | Jan. 6, 1959 |

FOREIGN PATENTS

| | | |
|---|---|---|
| 452,990 | Germany | Nov. 26, 1927 |
| 1,132,230 | France | Oct. 29, 1956 |

OTHER REFERENCES

B37745 XII 47h; Apr. 26, 1904; Germany.